United States Patent
Howell

(10) Patent No.: US 6,173,531 B1
(45) Date of Patent: Jan. 16, 2001

(54) PERFORATED CONTAINER

(75) Inventor: Kirk David Howell, 1539 Oakhill Rd., Auburn, GA (US) 30011

(73) Assignee: Kirk David Howell, Auburn, GA (US)

( * ) Notice: Under 35 U.S.C. 154(b), the term of this patent shall be extended for 0 days.

(21) Appl. No.: 09/198,302

(22) Filed: Nov. 23, 1998

(51) Int. Cl.[7] .................................................. A01G 23/02
(52) U.S. Cl. ..................................... 47/73; 47/78; 47/66.7
(58) Field of Search ............................ 47/73, 65.5, 65.7, 47/66.7, 78

(56) References Cited

U.S. PATENT DOCUMENTS

| | | | | |
|---|---|---|---|---|
| 4,098,021 | * | 7/1978 | Gruber ...................................... | 47/66 |
| 4,697,382 | * | 10/1987 | Koeniger ................................... | 47/73 |
| 4,753,037 | * | 6/1988 | Whitcomb ................................. | 47/73 |
| 4,939,865 | * | 7/1990 | Whitcomb et al. ....................... | 47/73 |

FOREIGN PATENT DOCUMENTS

| | | | |
|---|---|---|---|
| 30 47 818 | * | 9/1982 | (DE) . |
| 27 44 143 | * | 6/1983 | (DE) . |
| 2045044 | * | 10/1980 | (GB) . |

\* cited by examiner

*Primary Examiner*—Michael J Carone

(57) ABSTRACT

An improved method and container providing a root housing assembly to the plant which restricts the plant's thickest roots (greater than 1.5 millimeters in diameter) to remain within specified parameters. Regardless of the preferred container size, the lower seven eights portion of a container, perforated with a plurality of holes encircling the container permits fine, fibrous roots (less than 1.5 millimeters in diameter) to penetrate through to the soil surrounding the outside of the buried container's walls, whereas, the upper one eighth of the container is used for handling purposes, is not perforated, and provides a line of demarcation which will not permit root penetration into the soil environment outside of the container's walls. The holes with diameters of substantially 1.5 millimeters are equally spaced at distances of 3 millimeters apart. The roots which pass through these holes are not air-pruned, since the container is buried, but are restricted to the diameter of 1.5 millimeters. This root restriction will allow a wider root exploration of the soil environment, extensive root proliferation outside of the container's walls, an increase in fibrous root production inside of the container's walls, and will essentially promote rapid and continuous above-ground stem growth. Moreover, at lifting, roots are readily severed at the soil-container wall interface, due to the 1.5 mm diameter hole size, which facilitates the lifting and transplanting process, and ultimately ensures better field survival and growth of the plant.

1 Claim, 1 Drawing Sheet

PERFORATED CONTAINER

TECHNICAL FIELD OF THE INVENTION

The present invention relates to the general art of agriculture, and to the particular field of containers for growing transplantable plants.

BACKGROUND INFORMATION

This invention was developed with the intent of facilitating the planting operation of bare-root oak seedlings, and ensuring plantation success (i.e., survival and growth). Currently, bare-root oak seedlings grown for one year in open-grown nursery seed-beds have bulky, woody root systems, which make for cumbersome planting, and lead to excessive root pruning. The perforated container eliminates the need for root pruning, since the roots are prevented from elongating too far from the distal tap, but promotes fibrous rooting proximal to the distal tap on first and second order lateral roots. Moreover, the entire root system to be handled is not permitted to grow larger than the dimensions of the blade of the planting tool. The dimensions of the described perforated container, should not be confined to the specified parameters herein.

DETAILED DESCRIPTION OF THE PREFERRED EMBODIMENT

Figure 1:
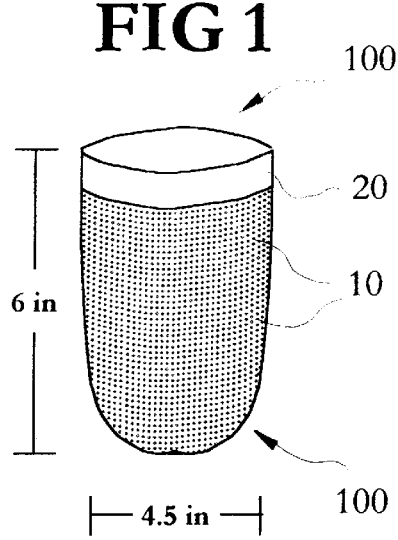
FIG. 1 is a perspective view of the perforated container.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Figure 2:
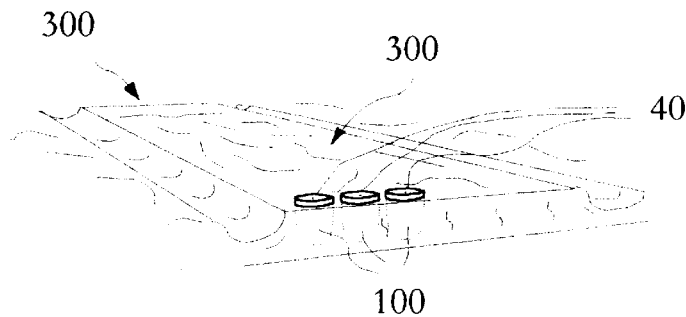
FIG. 2 is a perspective view of the perforated container shown in its operative environment.
Figure 3:
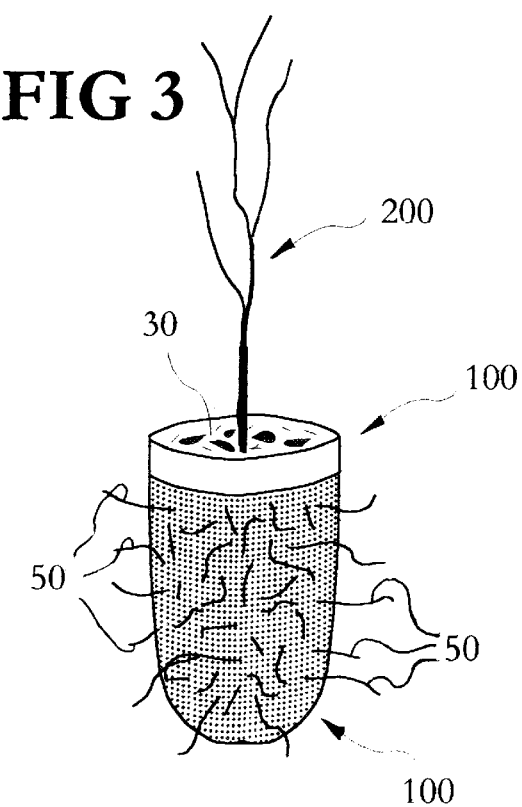
FIG. 3 is a perspective view of the perforated container with seedling and root penetration.

Referring now to the drawings, in which like characters of reference indicate like parts throughout the several views numeral 100 of FIGS. 1, 2, and 3 illustrates a preferred embodiment of this invention—the perforated container. For the purposes of better illustrating the new invention a six-inch long by 4.5 inch diameter container is shown and described.

FIG. 1 of the perforated container 100 shows, encircled around the lower seven eighths of its base, 1.5 mm holes 10, which are evenly spaced at 3 mm apart. The upper one eighth of the container 20 is not perforated, and is used for handling purposes, and as a line of demarcation.

As best shown in FIG. 2, after the preparation of the seed bed 300, the container 100 is inserted into the seed bed side by side along with other containers 100, having a portion of the upper one eighth exposed, and the container 100 is filled with soil FIG. 3; 30, where one or more seeds 40 can be sown in the middle, just beneath the surface of the soil 30, of each container 100.

As shown in FIG. 3, the container 100 contains a seedling 200 which may extend as tall and as wide as the container 100 can support. The soil 30 should settle some, and the fine, fibrous roots 50 (<1.5 mm thick) will penetrate through the 1.5 mm diameter holes 10 of the container 100, but roots cannot extend over the exposed portion, the upper one eighth portion 20, of the container 100.

Figure 4:
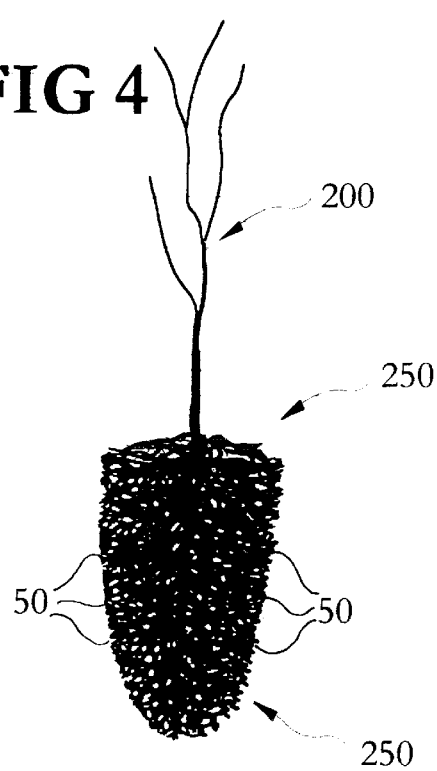
FIG. 4 is a perspective view of the seedling produced by the perforated container.

As illustrated in FIG. 4, the container FIG. 3; 100 has been removed, and the plant product 200 is ready for transplanting. The root mass 250 contains many fibrous roots 50 adequately severed and prepared to continue growing throughout the soil horizon of what will be its new environment 300.

It is understood that while certain forms of the present invention have been illustrated and described herein, it is not to be limited to the specific forms or arrangements of parts described and shown.

What is claimed is:

1. A root housing consisting of: a container having an upper portion and a lower portion, the upper portion measuring $\frac{1}{8}^{th}$ the length of the overall container, the lower portion perforated with preformed or drilled holes having a diameter of tub substantially 1.5 mm and covering a majority of the surface area of the lower portion wherein in use, the lower portion of the container is buried in the ground and serves as a container for growing a plant allowing penetration of only the fine, fibrous roots through the walls of the container and into the surrounding soil element during seedling growth, while the upper $\frac{1}{8}^{th}$ portion is neither perforated or buried and serves as a line of demarcation, restricting root penetration into the environment other than through the walls of the container.

* * * * *